June 19, 1923.
J. R. GAMMETER
WINDOWPANE FASTENING DEVICE
Filed Aug. 9, 1922
1,459,095
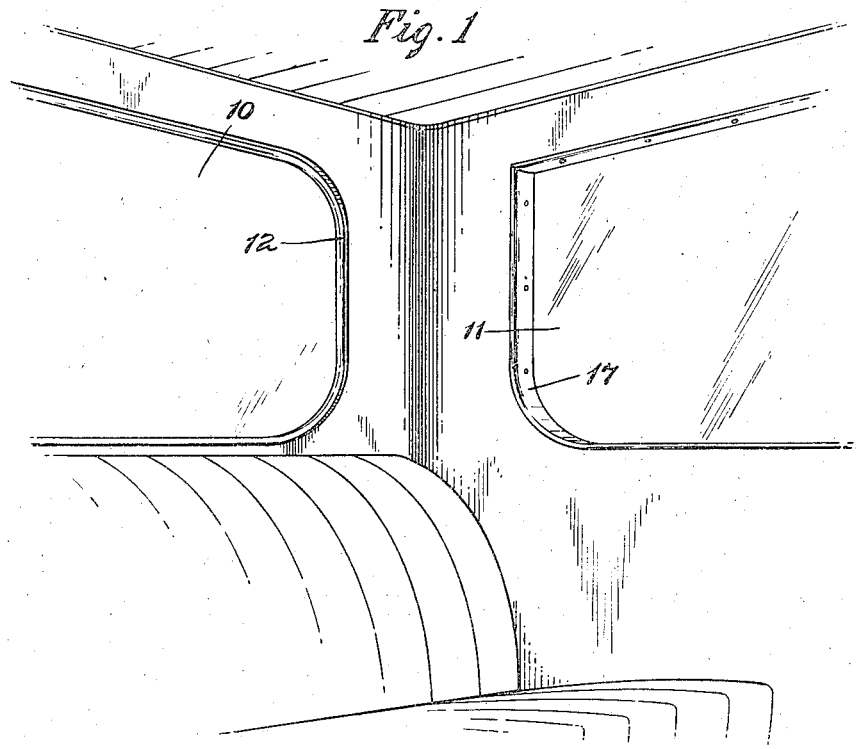
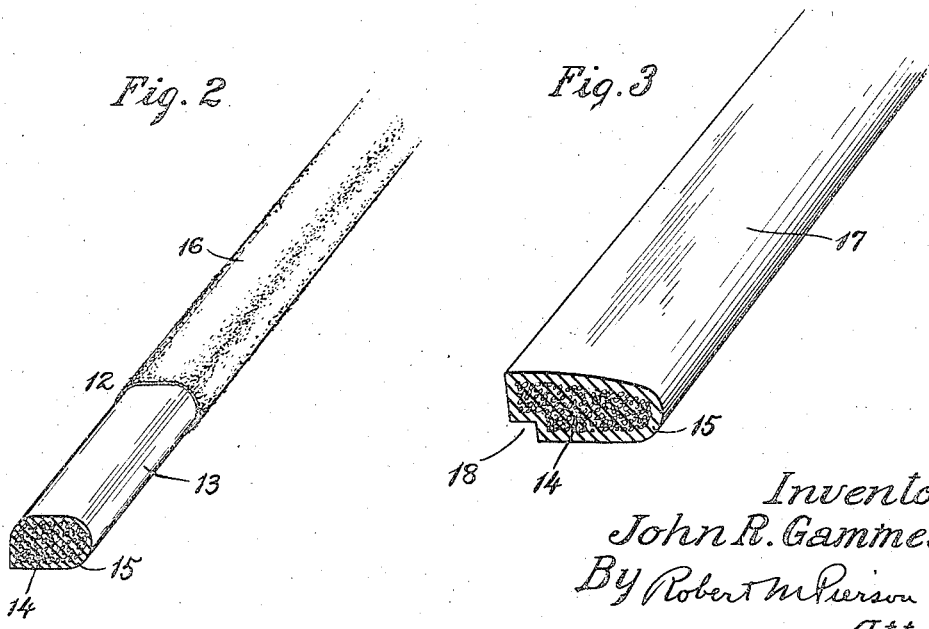
Inventor
John R. Gammeter
By Robert M Pierson
Atty.

Patented June 19, 1923.

1,459,095

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

WINDOWPANE-FASTENING STRIP.

Application filed August 9, 1922. Serial No. 580,653.

*To all whom it may concern:*

Be it known that I, JOHN R. GAMMETER, a citizen of the United States, residing at Akron, in the county of Summit and State of Ohio, have invented a certain new and useful Windowpane-Fastening Strip, of which the following is a specification.

This invention relates to fastening strips for retaining glass panes such as those of automobile and other windows. The frames of such windows are frequently made oval or with one or more rounded corners, which make it necessary that the garnishing, finishing or retaining strips be bent to a corresponding curvature. Wood, the material commonly used for such strips, often requires a slow and expensive steaming process in order to bend it properly, is subject to accidental splitting when dry and the final surface-finishing operations are comparatively laborious and costly.

The object of my invention is to provide an improved pane-fastening strip having the desirable features of wood without its objectionable properties, and to that end I have devised a strip made of a relatively-light, hardened, plastic material capable of taking a good finish, adapted to be softened by heat and to take a permanent set when cold, capable of being sawed and worked like wood, penetrable by nails or other pointed fasteners without splitting, and adapted to be made of uniform texture and at a relatively-low cost.

Of the accompanying drawings, Fig. 1 is a perspective view showing part of the interior of an automobile body and illustrating two slightly-differing applications of my invention.

Fig. 2 is a sectional perspective view showing one form of my improved retaining strip with a part of the cover removed.

Fig. 3 is a sectional perspective view showing another form.

In the drawings, 10 is the rear window-pane of an automobile, the frame of this window being of a type having all four corners rounded, and 11 is a side pane whose frame has at least one rounded corner.

12 is a strip adapted to take the place of the ordinary retaining strip for rear windows, which is commonly made of rattan wood. The body 13 of this improved strip is composed of a hardened, thermo-plastic material having a cellular internal structure or core 14 and a dense external portion or skin 15 integral therewith. I prefer to use sponge hard rubber for the purpose, it being a material which can be readily molded to any desired shape, of uniform texture, and is relatively light and workable by sawing, etc., like wood, but is non-splitting when penetrated by nails or other pointed fasteners. 16 is a textile covering of any suitable character such as felt or a soft, napped woven cloth, firmly attached by vulcanizing to the strip-body 13 to act as a cushion and packing against the pane.

17 is another form of the retaining strip applied to the side window-pane 11, being also made of sponge hard rubber with a cellular core 14 and a dense outer surface 15, but in this case the textile covering is omitted. An angular groove 18 is molded along one corner edge to receive a suitable packing. This strip may be given a smooth surface in the mold and may in addition be polished by the usual methods employed in finishing hard rubber, or it may be painted and varnished. By using one or more pigments in the compound the rubber may be colored as desired and the colors may be striated to give grained effects.

My improved retaining strips can be used in straight form or can be bent to a desired curvature at any selected locality on softening the material with a moderate degree of heat. The heat can be applied by placing the strip in an oven, or on a hot-plate or in hot water or otherwise as may be found convenient.

These strips are particularly suited for window-pane retainers but may also be employed for any analogous purpose.

I claim:

1. A window-pane retaining strip composed of a cellular, hardened, plastic material adapted to be softened by heat to permit the bending of the strip.

2. A window-pane retaining strip composed of a thermo-plastic, hardened material having a cellular internal structure and a dense outer surface.

3. A window-pane retaining strip composed of sponge hard rubber.

4. A window-pane retaining strip composed of hard rubber having a dense external surface and a cellular internal structure.

5. A window-pane retaining strip composed of cellular hard rubber and having a textile covering vulcanized thereon.

6. A window-pane retaining strip composed of hard rubber having a dense external surface and a cellular internal structure, and a textile covering vulcanized on said external surface.

In witness whereof I have hereunto set my hand this 3 day of August, 1922.

JOHN R. GAMMETER.